United States Patent
Duphorne et al.

(10) Patent No.: US 9,593,572 B2
(45) Date of Patent: Mar. 14, 2017

(54) APPARATUS AND METHODS FOR LEAK DETECTION IN WELLBORES USING NONRADIOACTIVE TRACERS

(71) Applicants: Darin H. Duphorne, Houston, TX (US); Rocco DiFoggio, Houston, TX (US)

(72) Inventors: Darin H. Duphorne, Houston, TX (US); Rocco DiFoggio, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 4 days.

(21) Appl. No.: 14/503,963

(22) Filed: Oct. 1, 2014

(65) Prior Publication Data

US 2016/0097274 A1    Apr. 7, 2016

(51) Int. Cl.
 *E21B 47/10* (2012.01)
 *G01V 5/10* (2006.01)

(52) U.S. Cl.
 CPC .......... *E21B 47/1015* (2013.01); *G01V 5/101* (2013.01)

(58) Field of Classification Search
 CPC ............................ E21B 47/1015; G01V 5/102
 USPC ......................................................... 250/260
 See application file for complete search history.

(56) References Cited

U.S. PATENT DOCUMENTS

| | | | |
|---|---|---|---|
| 3,317,726 A * | 5/1967 | Caldwell ............. | E21B 47/1015 250/259 |
| 5,036,916 A * | 8/1991 | Bennett ................. | E21B 49/088 166/253.1 |
| 5,441,110 A * | 8/1995 | Scott, III .............. | E21B 43/267 166/308.1 |
| 2002/0121371 A1 * | 9/2002 | Moake .................... | E21B 43/12 166/250.07 |
| 2009/0145601 A1 | 6/2009 | Bailey | |
| 2010/0067329 A1 | 3/2010 | Edwards et al. | |
| 2012/0000658 A1 | 1/2012 | Coludrovich, III et al. | |

(Continued)

FOREIGN PATENT DOCUMENTS

EP    2599955 A1    6/2013

OTHER PUBLICATIONS

Ciudad, D. et al.; "RFID in Metal Environments: An Overview on Low (LF) and Ultra-Low (ULF) Frequency Systems", Radio Frequency Identification Fundamentals and Applications, Design Methods and Solutions, ISBN 978-953-7619-72-5, , pp. 181-196, Feb. 2010.

(Continued)

*Primary Examiner* — David Porta
*Assistant Examiner* — Gisselle Gutierrez
(74) *Attorney, Agent, or Firm* — Cantor Colburn LLP

(57) ABSTRACT

In one aspect, a wellbore system is disclosed for determining breach of cement section in the wellbore, wherein the system includes a cement section in the wellbore formed to prevent flow of fluids including hydrocarbons through the cement section, nonradioactive tracers that emit radioactive emission when activated by a radiation source, a radioactive source that generates radioactive particles to activate the nonradioactive tracers that have migrated through the cement to cause the nonradioactive tracers to emit radiation, a detector for detecting the radioactive emission from the nonradioactive tracer, and a processor that determines from the detected radioactive emission a fluid leak through the cement section.

19 Claims, 2 Drawing Sheets

(56) References Cited

U.S. PATENT DOCUMENTS

| | | | | |
|---|---|---|---|---|
| 2013/0062057 A1* | 3/2013 | Smith, Jr. | ............... | E21B 47/00 |
| | | | | 166/254.2 |
| 2013/0292109 A1* | 11/2013 | Smith, Jr. | ............... | E21B 43/04 |
| | | | | 166/250.1 |
| 2014/0034823 A1* | 2/2014 | Hyde-Barber | .......... | C04B 28/02 |
| | | | | 250/269.4 |

OTHER PUBLICATIONS

Gao et al.; "Practical implications of nonlinear inversion for cross-well electromagnetic data collected in cased-wells", SEG Las Vegas 2008 Annual Meeting, pp. 299-303.

* cited by examiner

APPARATUS AND METHODS FOR LEAK DETECTION IN WELLBORES USING NONRADIOACTIVE TRACERS

BACKGROUND

1. Field of the Disclosure

This disclosure relates generally to apparatus and methods for determining integrity of cement sections in wellbores.

2. Background of the Art

Wellbores are drilled in subsurface formations for the production of hydrocarbons (oil and gas). Modern wells can are drilled to great well depths, often more than 15,000 ft. Hydrocarbons are trapped in various zones in the subsurface formations at different wellbore depths. Such zones are referred to as reservoirs or hydrocarbon-bearing formations or production zones. A casing is generally placed inside the wellbore and the space between the casing and the wellbore (annulus) is filled with cement. A production string or assembly containing a number of devices is placed inside the casing to perform a variety of operations downhole, including, but not limited to, fracturing, treatment and production of fluids from the formation to the surface. Once the well is no longer productive, a section of the well is filled or plugged with cement and abandoned. It is important to determine the integrity of the cement section on an ongoing basis. Also, during the productive life of the wellbore and when it comes time to plug and abandon a well, it is desirable to determine the integrity of the cement between the casing and the wellbore.

The disclosure herein provides apparatus and methods for detecting leaks or breach through and around the cement sections in wellbores using nonradioactive tracers.

SUMMARY

In one aspect, a wellbore system is disclosed for determining breach of cement section in the wellbore, wherein the system includes a cement section in the wellbore formed to prevent flow of fluids including hydrocarbons through the cement section, nonradioactive tracers placed in a fluid below the cement section that temporarily emit radioactive emission in response to an induced radioactive energy (so we are not generating radioactive waste), a radioactive source (preferably, a source that can be turned off, such as a pulsed neutron source, rather than an always-emitting chemical source) that produces the radioactive particles to activate the nonradioactive tracers (preferably, tracers with high cross section for radiation emanating from the radioactive source) that have migrated through the cement to cause the nonradioactive tracer to temporarily emit radioactive emission, a detector for detecting the radioactive emission from the nonradioactive tracer, and a processor that determines from the detected radioactive emission a fluid leak through the cement section.

In another aspect, a method of determining a breach through a cement section in a wellbore is disclosed. The method, in one non-limiting embodiment includes: placing a nonradioactive tracer in a fluid that is in fluid communication with the cement section; wherein the nonradioactive tracer temporarily emits a radioactive emission when it is activated by radiation from a source; activating any nonradioactive tracer that may have migrated through the cement to make such tracer emit the radioactive emission; detecting the radioactive emission from the nonradioactive tracers that have migrated through the cement section; and determining from the detected radioactive emission the presence and location of any breaches through the cement section.

Examples of the more important features of the apparatus and methods disclosed herein are summarized rather broadly in order that the detailed description thereof that follows may be better understood, and in order that the contributions to the art may be appreciated. There are, of course, additional features that will be described hereinafter and which will form the subject of the claims.

BRIEF DESCRIPTION OF THE DRAWINGS

For a detailed understanding of the apparatus and methods disclosed herein, reference should be made to the accompanying drawings and the detailed description thereof, wherein like elements are generally given same numerals and wherein.

DETAILED DESCRIPTION OF THE DRAWINGS

Figure 1:
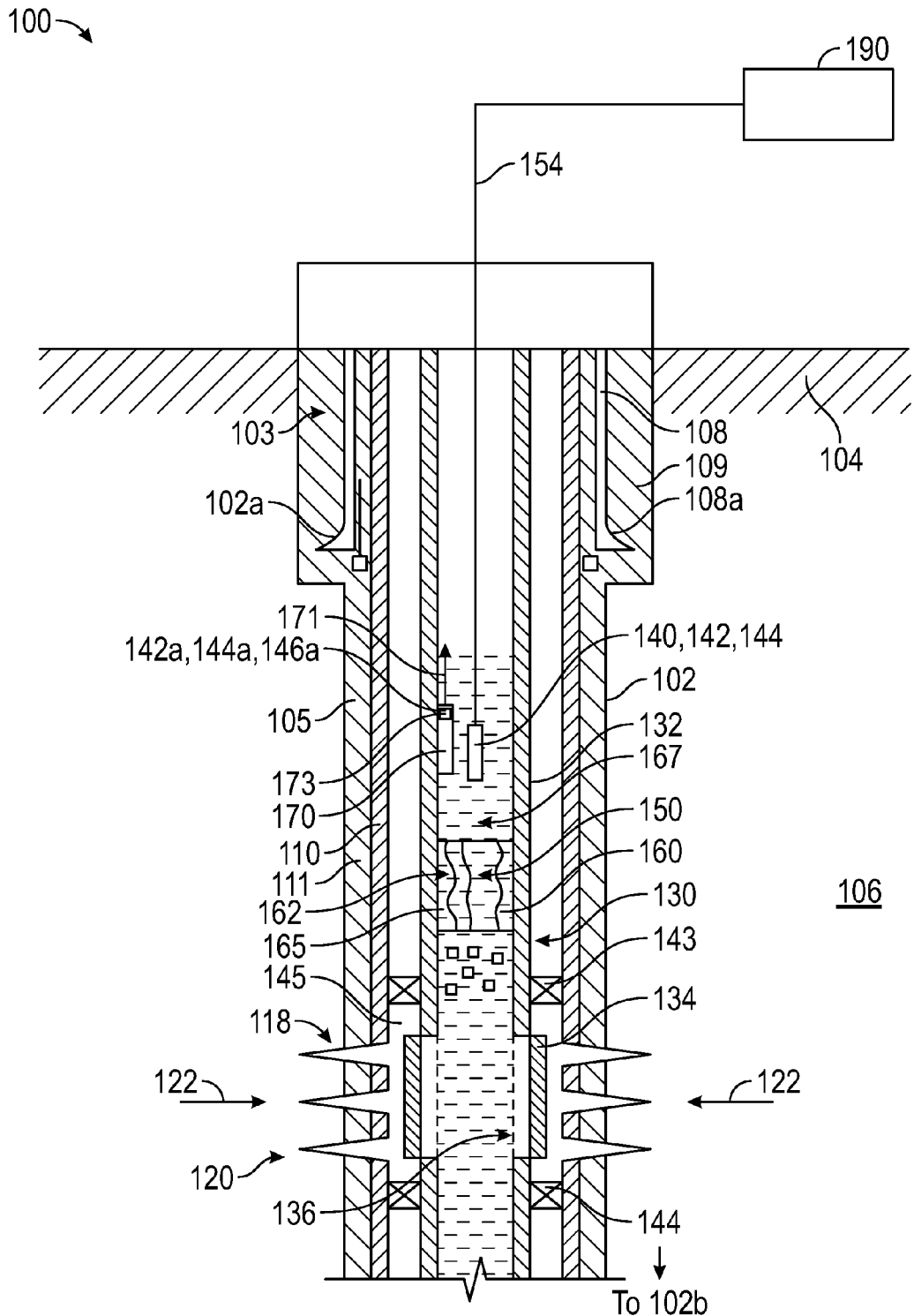
FIG. 1 shows a cased well system in which a breach of a cement section is determined from nonradioactive tracers migrating upward from below the cement section.

FIG. 1 shows a cased well system 100 in which a cement section or plug has been placed to prevent flow of fluid from a formation to the surface, wherein nonradioactive tracers are used for determining breach of the cement section. The system 100 is shown to include a wellbore 102 formed from a surface location 104 into a formation 106. An upper casing 108 placed in the wellbore extends to a first depth 102a and a lower casing 110 runs to the bottom 102b of the wellbore. Cement 109 fills the annulus 103 between the casing 108 and the wellbore 102, while cement 111 fills the annulus 105 between the casing 110 and the wellbore 102. Perforations 118 through the casing 110 and the cement 111 at a production zone 120 allow formation fluid 122 (oil, gas, water) to flow from the formation 106 into the casing 110. A production string 130 is shown placed or deployed inside the casing 110 to produce the formation fluid 122 to the surface 104.

The production string 130 is shown to include a tubular 132, one or more sand screens, such as screen 134 and various other devices, such as valves (not shown) to transport the formation fluid 122 from the production zone 120 to the surface. Isolation devices, such as packers 143 and 144, are provided to seal the annulus 145 between the casing 108 and the production string 130 above and below the production zone 120. Once the well 102 has lived its useful production life or for other reasons, it may be desirable to abandon the well. In such a case, in one non-limiting embodiment, a section 150 of the production string 130 may be filled with cement 152 (also referred to herein as the "cement plug" or "cement section") so as to prevent the formation fluid 122 from entering into the tubular 132.

In the embodiment of FIG. 1, cement section 150 may experience cracks over time that would provide leak paths through and/or around the cement section 150. For example, a leak path 160 may develop between the casing 110 and the cement section 150. In another aspect, a leak path 162 may develop through the cement plug 150. Other leak paths (not shown) may also develop. Such leak paths would breach the integrity of the cement section 150 and might cause the fluid 115 to migrate uphole through the cement section 150 defeating the purpose of placing the cement section 150 in the well 102. To detect a breach of integrity (i.e., cracks) of a cement section 150, in one non-limiting embodiment, nonradioactive tracers 165 (squares) may be placed or injected into the fluid 115 in the wellbore 101. The nonradioactive tracers 165 may include any suitable tracer or tracers, including but not limited to, Gadolinium 157 (Gd157). Other tracers with a high cross section for neutrons that temporarily produce gamma rays with sufficient energy to pass through casing include Cadmium, include but are limited to, 113 (Cd113) and Samarium 149 (Sm149). Such tracers remain inactive (nonradioactive) until activated by a radioactive particles (radioactive energy energy), such as neutrons. Once activated, such nonradioactive tracers temporarily emit gamma rays. If there is a breach of the cement section 150, the nonradioactive tracers 165 may migrate or travel uphole through such breaches due to the pressure of the fluid 115 below the cement section 150. The migrated nonradioactive tracers are labeled 167 and shown as triangles. The neutrons generated by sources can pass through casing when detecting breaches through cement in annulus between the casing and the wellbore, as described in reference to FIG. 2. Also, neither the neutrons generated by a source in the wellbore nor gamma rays emitted by the tracers generate any enduring radioactive waste because the tracers emit prompt gammas that last about a nanosecond.

Still referring to FIG. 1, to detect migrated nonradioactive tracers 167, a tool 140, containing a neutron source 142, such as pulsed neutron source, may be conveyed into the wellbore 102 to a suitable location or depth above the cement section 150 by a conveying member 154, such as a wireline or coiled tubing. The tool 140 also may include a gamma ray detector 144, such as a sodium iodide detector coupled to a phototube, known in the art, to detect gamma rays emitted by the nonradioactive tracers 167 when activated and provide light pulses corresponding to the detected gamma rays. Neutron sources and gamma ray detectors are known in the art and are thus not described in detail. In one embodiment, a controller 170 (containing a microprocessor, memory device and programmed instructions) may be provided in the tool 140 to control the operation of the neutron generator 142 and process signals from the detector 144 to determine the extent and nature of the breach in the cement section 150. In another embodiment, a controller or control circuit 190 may be provided at the surface to control the operation of the tool 140 and process information from the detector 144. In another embodiment, controllers 170 and 190 may cooperate with each other to control the tool 140 and process signals from the detector 144. In one embodiment, the source 142 may be activated to generate neutrons that activate the migrated tracers 167, which temporarily emit gamma rays in response to such neutrons. The detector 144 detects the gamma rays emitted by the tracers 167 and a circuit 146 processes the signals from the detector 144 from which the type and extent, if any, of the breach is determined. In one aspect, the tool 140 may be pulled upward while the tool 140 is in operation to obtain a log of the detected gamma rays relative to the wellbore depth. In another embodiment, a module 140a containing a nuclear energy source 142a, detector 144a, and control circuit 146a may be placed in the wellbore. A controller 170a may be programmed to periodically or in response to command signals from the surface controller 190, cause the nuclear source 142a to generate neutrons and the circuit 146a to process any signals from the detector 144a to determine a breach in the cement section 150. A link 171 or a wireless transducer 173 may be used to for two-way communication between the tool 140 or module 140b and the surface controller 190.

Figure 2:
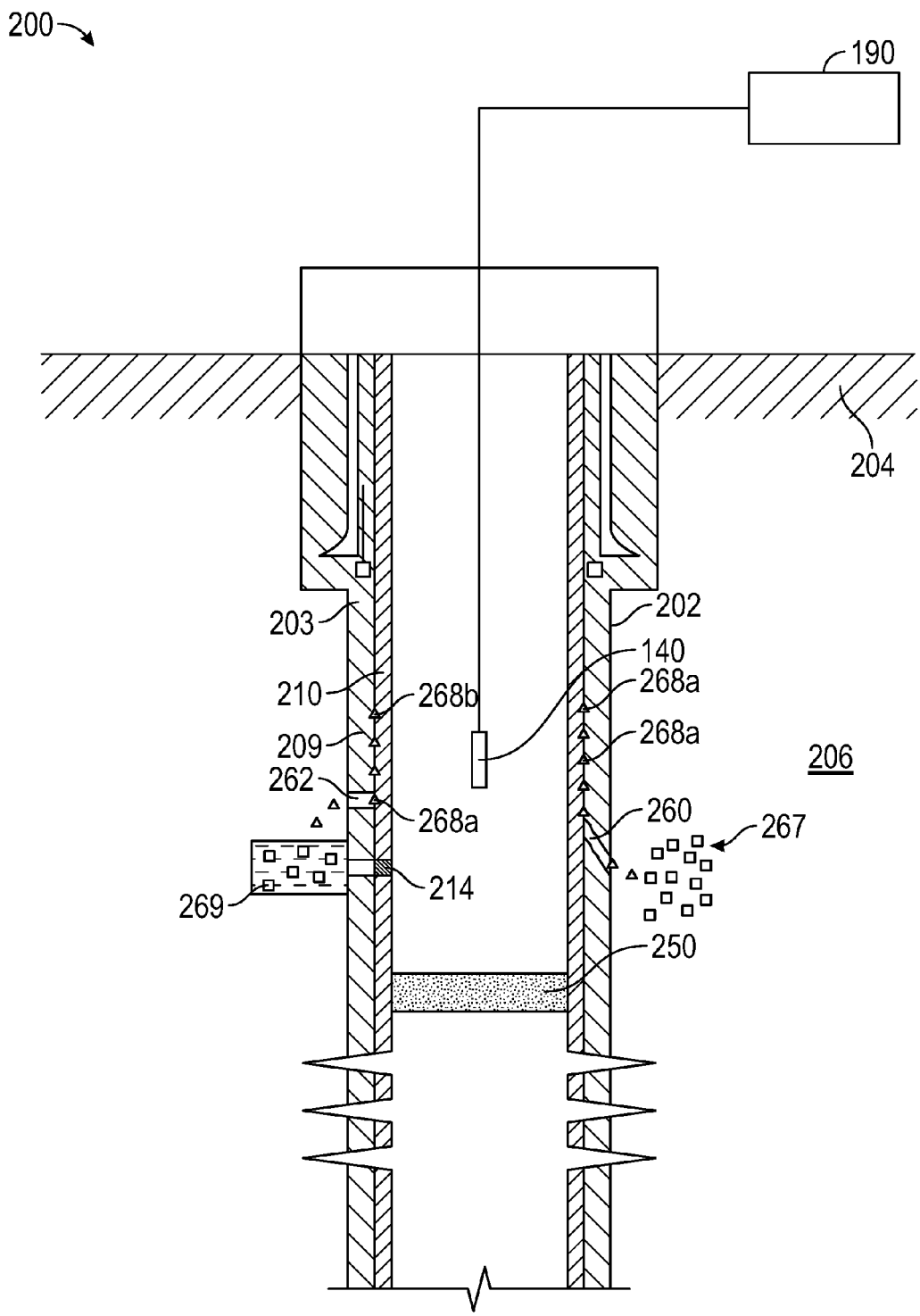
FIG. 2 shows a well system in which a breach in a cement in an annulus between a casing and the wellbore is determined from nonradioactive tracers migrating through the cement.

FIG. 2 shows a cased well system 200 in which nonradioactive tracers may be utilized to detect breaches in the cement placed between the casing and the formation. The system 200 is shown to include a wellbore 202 formed from a surface location 204 into a formation 206. The wellbore 202 is lined with a casing 210 and the annulus 203 between the casing 210 and the wellbore 202 is filled with cement 209. The wellbore 202 may include a cement plug 250. The cement 209 surrounding the casing 210 may develop cracks, such as upward cracks 260, sideway cracks 262 etc., over time that create a fluid path from the formation 206 to the casing 210. To detect such cracks or breaches, nonradioactive tracers 267a may be pumped into the formation 206 before cementing operations. In another embodiment, tracers 269 in a fluid may be placed in the cement 209 through the casing 210 and then sealing any holes 214 drilled in the casing 210 for placing the tracers 269 in the cement 209.

A downhole tool 140, described in reference to FIG. 1, may be conveyed into the wellbore 202 to generate nuclear energy to activate any migrated tracers 268a and/or 268b and a controller, such as controller 170 and/or 190 to determine the cracks or braches in the cement 209, in the manner described in reference FIG. 1. The tool 140 may be moved uphole while operating to obtain a log of the detected gamma rays relative to the wellbore depth. The type and the extent of the breaches may be determined from the detected gamma rays as described in reference to FIG. 1.

The foregoing disclosure is directed to certain exemplary embodiments and methods. Various modifications will be apparent to those skilled in the art. It is intended that all such modifications within the scope of the appended claims be embraced by the foregoing disclosure. The words "comprising" and "comprises" as used in the claims are to be interpreted to mean "including but not limited to". Also, the abstract is not to be used to limit the scope of the claims.

The invention claimed is:

1. A wellbore system, comprising:
   a cement section in the wellbore formed to prevent flow of fluids through the cement section;
   a nonradioactive tracer placed in a fluid on one side of the cement section;
   a radioactive source on an other side of the cement section that induces radioactive energy to activate the nonradioactive tracer upon migration of the nonradioactive tracer through a breach in the cement to the other side to cause the migrated nonradioactive tracer to emit radioactive emission in response to the induced radioactive energy;
   a detector for detecting the radioactive emission from the migrated nonradioactive tracer; and
   a controller that determines existence of the breach in the cement section from the detected radioactive emission.

2. The wellbore system of claim 1, wherein the radioactive source and the detector are conveyed into the wellbore with a conveying member.

3. The wellbore system of claim 1, wherein the radioactive source and the detector are permanently placed inside the wellbore and the radioactive source is configured to emit radioactive energy as one of: periodically to detect the radioactive emission over a time period; and in response to a command signal.

4. The wellbore system of claim 2 further comprising a controller that controls emission of the radioactive energy in the wellbore.

5. The wellbore system of claim 1, wherein the cement section is a cement plug placed in the wellbore and the tracer is placed in fluid below the cement plug.

6. The wellbore system of claim 1, wherein the radioactive source generates neutron and the nonradioactive tracers emit gamma rays when activated by the neutrons.

7. The wellbore system of claim 1, wherein the nonradioactive tracer is selected from a group consisting of: Gadolinium 157 (Gd157), Cadmium 113 (Cd113) and Samarium 149, (Sm149).

8. The wellbore system of claim 1, wherein the cement section is between the wellbore and a casing in the wellbore and wherein the nonradioactive tracer is placed inside the cement section and the radioactive source generates neutrons from a location inside the casing in the wellbore.

9. The wellbore system of claim 1, wherein the nuclear source and the detector are on a movable member configured to provide a log of the detected radioactive emission relative to the wellbore depth to determine an extent of a breach in the cement section.

10. The wellbore system of claim 9 further comprising a controller that controls the radioactive source from a location that is one of: in the wellbore; and from a surface location.

11. A method of detecting a breach in a cement section in a wellbore, the method comprising:
    placing a nonradioactive tracer in a fluid on one side of the cement section;
    activating the nonradioactive tracer upon migration of the nonradioactive tracer through a breach in the cement section by inducing a radioactive energy into the migrated nonradioactive tracer to cause the migrated nonradioactive tracer to emit the radioactive emission; and
    detecting the radioactive emission from the migrated nonradioactive tracer; and
    determining from the detected radioactive emission the existence of the breach in the cement section.

12. The method of claim 11, wherein:
    activating the nonradioactive tracer comprises generating the radioactive energy from a source in the wellbore; and
    detecting the radioactive emission comprises detecting the radioactive emission by a detector in the wellbore.

13. The method of claim 12, wherein the radioactive energy includes neutrons generated by a neutron generator and the radioactive emission includes gamma rays.

14. The method of claim 13, wherein the nonradioactive tracer includes gadolinium 157 (GD-157).

15. The method of claim 11, wherein the cement section includes a cement plug in the wellbore and the nonradioactive tracer is placed below the cement plug and inducing radioactive energy comprises generating neutrons from a location above the cement plug.

16. The method of claim 11, wherein the cement section is between the wellbore and a casing in the wellbore and wherein the nonradioactive tracer is placed inside the cement section and inducing the radioactive energy comprises generating neutrons form a source inside the casing in the wellbore.

17. The method of claim 11, wherein detecting the radioactive emission comprises obtaining a log of the detected radioactive emission relative to the wellbore depth to determine an extent of the breach through the cement section.

18. The method of claim 11 further comprising using a permanently placed nuclear energy source to generate the nuclear energy as one of: periodically according to programmed instructions; and in response to command signals.

19. The method of claim 18 further comprising controlling the generation of the nuclear energy from a location that is one of: in the wellbore; and a surface location.

* * * * *